US009573460B2

(12) United States Patent
Bemis et al.

(10) Patent No.: US 9,573,460 B2
(45) Date of Patent: Feb. 21, 2017

(54) HYDROCARBON STORAGE VESSELS

(71) Applicant: Floats and Fuel Cells, Inc., Memphis, TN (US)

(72) Inventors: Gerald A. Bemis, Limestone, TN (US); Fred G. Tavoleti, Memphis, TN (US); Thomas C. Guthrie, Byhalia, MS (US); A. D. Wiley, Painburn, AR (US); Dave Sutphin, Arlington, TN (US); Henry Mac Swope, Memphis, TN (US); Lisa K. Kemp, Hattiesburg, MS (US); Jeff A. Burger, Petal, MS (US); L. Bryan Brister, Biloxi, MS (US); Robson F. Storey, Hattiesburg, MS (US)

(73) Assignee: FLOATS AND FUEL CELLS, INC., Memphis, TN (US)

( * ) Notice: Subject to any disclaimer, the term of this patent is extended or adjusted under 35 U.S.C. 154(b) by 367 days.

(21) Appl. No.: 14/184,483

(22) Filed: Feb. 19, 2014

(65) Prior Publication Data
US 2015/0231966 A1 Aug. 20, 2015

(51) Int. Cl.
*B60K 15/03* (2006.01)
*B63B 17/00* (2006.01)
(Continued)

(52) U.S. Cl.
CPC ...... *B60K 15/03177* (2013.01); *B29D 22/003* (2013.01); *B32B 33/00* (2013.01); *B60K 15/03006* (2013.01); *B63B 17/0027* (2013.01); *B64D 37/06* (2013.01); *B32B 37/1284* (2013.01); *B32B 2038/0076* (2013.01); *B32B 2305/18* (2013.01); *B32B 2307/7242* (2013.01); *B32B 2319/00* (2013.01); *B32B 2439/40* (2013.01); *B32B 2605/08* (2013.01); *B32B 2605/12* (2013.01); *B32B 2605/18* (2013.01); *B60K 2015/03046* (2013.01); *B60K 2015/03486* (2013.01); *B60K 2015/03493* (2013.01);
(Continued)

(58) Field of Classification Search
CPC ........ B60K 15/03177; B60K 15/03006; B60K 2015/03046; B60K 2015/03486; B60K 2015/03493; B63B 17/0027; B32B 37/1284; B32B 2439/40; B32B 2605/18; B32B 2605/12; B32B 2605/08; B32B 33/00; B32B 2038/0076; B32B 2305/18; B32B 2307/7242; B32B 2319/00; B64D 2700/62315; Y10T 156/1039; B29D 22/003

See application file for complete search history.

(56) References Cited

U.S. PATENT DOCUMENTS

| 4,419,499 A | * | 12/1983 | Coran | C08G 18/86 525/403 |
|---|---|---|---|---|
| 5,298,303 A | | 3/1994 | Kerr et al. | |

(Continued)

FOREIGN PATENT DOCUMENTS

EP 2232120 B1 4/2012

*Primary Examiner* — Michael C Miggins
(74) *Attorney, Agent, or Firm* — International IP Law Group, P.L.L.C.

(57) ABSTRACT

Methods and systems described herein provide or use a wall structure for a hydrocarbon storage vessel. The wall structure includes an inner layer that includes a first rubber compound. A center layer includes a polymer film. An outer layer includes a second rubber compound.

21 Claims, 12 Drawing Sheets

(51) Int. Cl.
  *B64D 37/06*   (2006.01)
  *B29D 22/00*   (2006.01)
  *B32B 33/00*   (2006.01)
  *B32B 37/12*   (2006.01)
  *B32B 38/00*   (2006.01)

(52) U.S. Cl.
  CPC .............. *B64D 2700/62315* (2013.01); *Y10T 156/1039* (2015.01)

(56) References Cited

U.S. PATENT DOCUMENTS

| | | |
|---|---|---|
| 5,524,671 A | 6/1996 | Yoshida et al. |
| 6,082,025 A * | 7/2000 | Bonk ................... A43B 1/0045 36/28 |
| 6,699,936 B1 | 3/2004 | Nishimura et al. |
| 6,959,735 B2 | 11/2005 | Seyler et al. |
| 2003/0049401 A1 | 3/2003 | Duke et al. |
| 2010/0316310 A1 | 12/2010 | Heater et al. |
| 2012/0305711 A1 | 12/2012 | Shannon |

* cited by examiner

100

300

400

500

600

800

900

1000

1200

HYDROCARBON STORAGE VESSELS

FIELD

Exemplary embodiments of the present techniques relate to systems and methods for forming liquid storage containers. More specifically, the systems and methods described can be used for the storage of hydrocarbons, including fuel tanks and portable tanks.

BACKGROUND

This section introduces various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Fuel can be stored in a vehicle, such as an aircraft, in any number of ways. For example, the fuel can be held in metal tanks, in an integral fuel storage area, called a wet wing in aircraft, or in a bladder. The bladder is often termed a fuel cell, and can hold the fuel in case of damage to the storage system.

Fuel cells are often made using a base material that includes either a nitrile rubber or a polyurethane. They are manufactured by combining two or more layers of material to create an inner liner bonded to an outer liner. The inner layers are selected to be non-porous and resistant to fuel. The outer layer is selected to protect the fuel cell from heat, ozone, humidity, and other external hazards, such as puncture. Fuel cells formed from nitrile rubber compounds are vulcanized (autoclave cured) to increase strength and reduce permeability.

Current techniques for forming fuel cells were developed in the mid-twentieth century and involve numerous complex steps for formation and assembly. Accordingly, the cost and complexity of current fuel cells may limit their use in lower cost vehicles.

SUMMARY

Embodiments described herein provide a wall structure for a hydrocarbon storage vessel. The wall structure includes an inner layer that includes a first rubber compound. A center layer includes a polymer film. An outer layer includes a second rubber compound.

Another embodiment provides a method for forming a hydrocarbon storage vessel. The method includes calendering rubber sheets on each side of a polymer film to form a wall structure.

Another embodiment provides a fuel cell that includes a cured structure configured to store a hydrocarbon, wherein the structure is formed from a plurality of wall structures. Each wall structure includes an inner layer comprising a first rubber compound, a center layer including a polymer film, and an outer layer comprising a second rubber compound.

BRIEF DESCRIPTION OF THE DRAWINGS

Certain exemplary embodiments are described in the following detailed description and in reference to the drawings, in which.

DETAILED DESCRIPTION

In the following detailed description section, the present techniques are described in connection with exemplary embodiments. However, to the extent that the following description is specific to a particular embodiment or a particular use of the present techniques, this is intended to be for exemplary purposes only and simply provides a description of the exemplary embodiments. Accordingly, the present techniques are not limited to the specific embodiments described below, but rather, such techniques include all alternatives, modifications, and equivalents falling within the true spirit and scope of the appended claims.

Exemplary embodiments of the present techniques provide systems and methods for the construction and use of hydrocarbon storage containers. The hydrocarbon storage containers may be flexible or rigid, and may be used in any number of applications. For example, the hydrocarbon storage containers may be used as fuel tanks on vehicles, as temporary tanks in outside environments, as waste disposal tanks, and the like. Materials that could be stored in the hydrocarbon storage containers include, for example, hydraulic fluid, fuels, Aviation gas, jet fuel, or any other type of hydrocarbon liquid.

The hydrocarbon storage containers can be formed as multi-layer structures, for example, including an inner layer that is resistant to degradation by the hydrocarbon, a center layer that is substantially impermeable, and an outer layer that provides resistance to external environmental conditions and physical damage. Other layers, such as structural reinforcements, adhesives, and additional barrier layers, among others, may be included in the structure.

Figure 1:
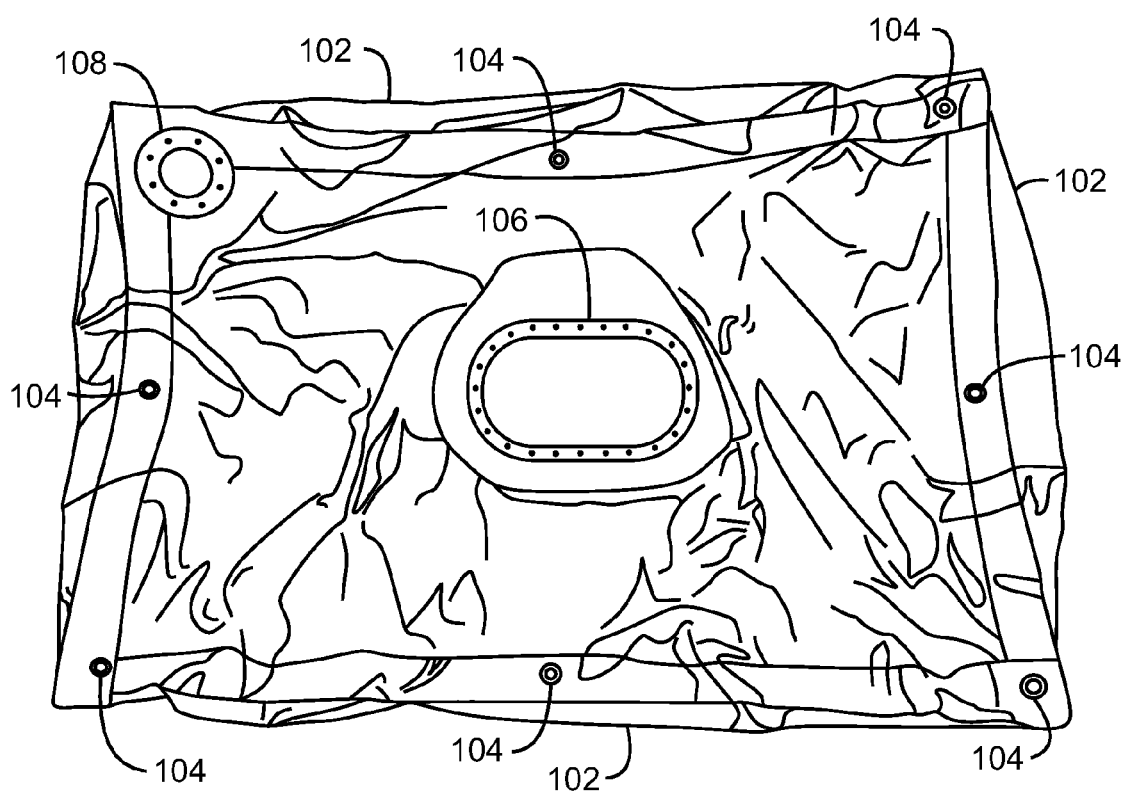
FIG. 1 is a drawing of a fuel cell.

FIG. 1 is a drawing of a fuel cell 100. The fuel cell 100, which may also be termed a hydrocarbon storage tank, is made from a number of flexible walls 102 that are bonded together. The fuel cell shape is formed by laying the sheets over a cardboard mold that has the general shape of the desired tank. The wall parts are glued together and cured, for example, at an elevated temperature of 75° C., 100° C., 150° C., 250° C., or higher. The curing may be done under an inert atmosphere, such as nitrogen, to prevent degradation. Further, the curing may be done under pressure to avoid gas formation or porosity in the rubber. As used herein, a rubber or rubber compound can include any number of elastomeric materials that can be heat cured to form a hydrocarbon-resistant, cross linked structure.

The fuel cell 100 can be configured with mounting points, or grommets 104, that can hold the fuel cell 100 in place in a vehicle. Various openings can be made into the fuel cell 100, such as a filling port 106, a vent port 108, or a drain port (not shown), among others.

The flexible walls 102 are resistant to hydrocarbons and environment conditions, such as ozone, heat, and puncture. To meet these demands, the wall structure can be formed as described herein. Further, the fuel cell 100 are not limited to flexible structures, but may also be formed with rigid outer walls, as described with respect to FIG. 2.

Figure 2:
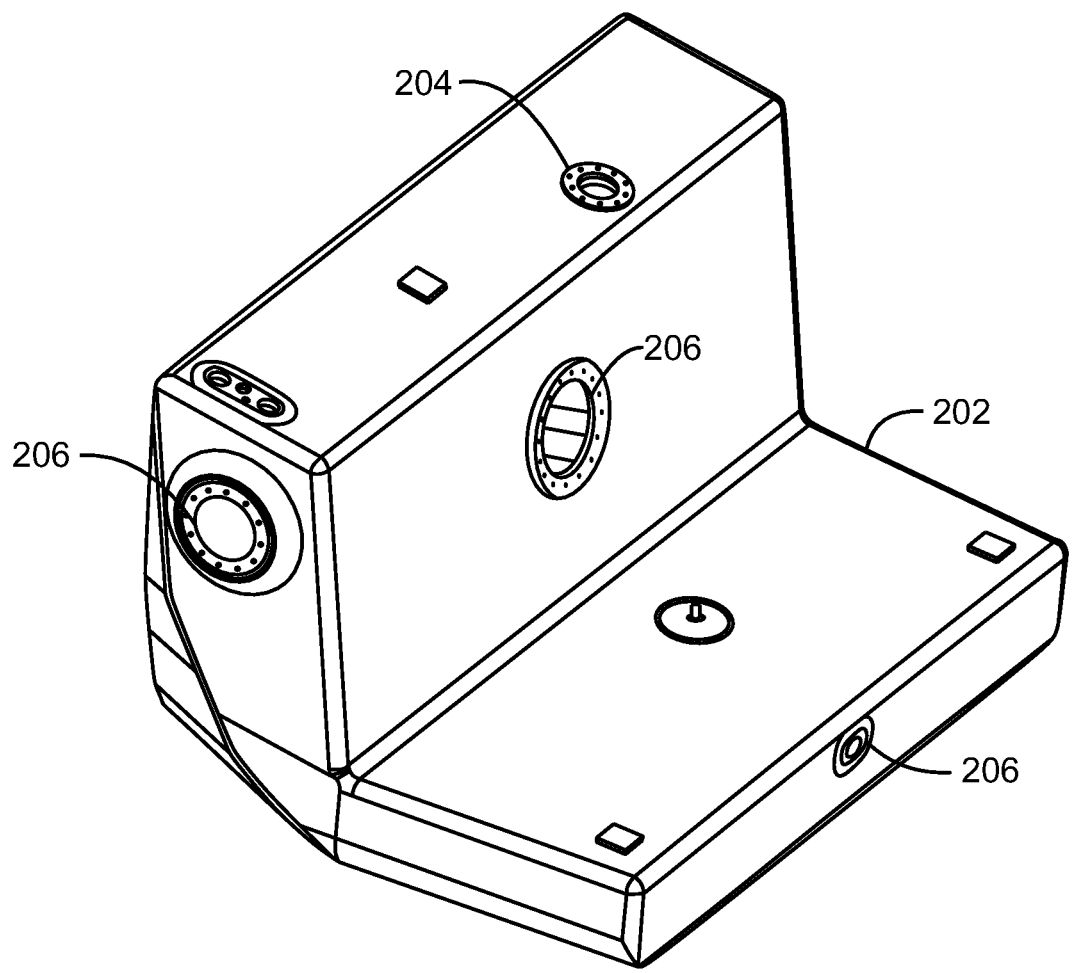
FIG. 2 is a drawing of a rigid tank in which a fuel cell has been formed.

FIG. 2 is a drawing of a rigid tank 200 in which a fuel cell has been formed. In this example, the fuel cell may be formed using an outer layer 202 made from rubber sheets that are thick, e.g., about 5 mm (about 0.3 in) or greater, and relatively inflexible, e.g., forming a structure that holds its shape. Like the fuel cell 100 described with respect to FIG. 1, the rigid tank 200 has a refueling connection 204 and any number of other connections 206, including, for example, fuel feed connections, fuel transfer lines, fuel vents, sump drains, and the like.

Figure 3:
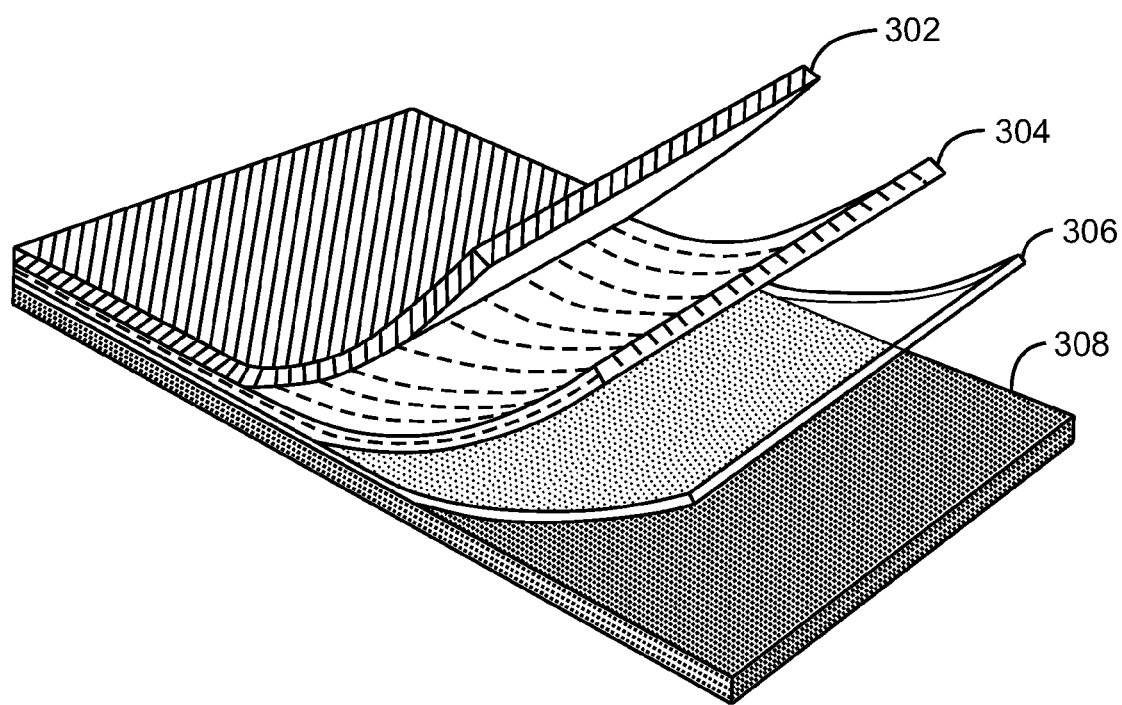
FIG. 3 is a drawing of a wall structure that can be used in a fuel cell wall.

FIG. 3 is a drawing of a wall structure 300 that can be used in a fuel cell wall. The wall structure 300 shown in this example has four primary functional layers, although many other layers and materials, such as adhesives and treatments, may also be present. An outer layer 302 provides the wall structure 300 with resistance to environmental issues, such as ozone, oxygen, water, water vapor, punctures, and the like. In some examples, such as discussed with respect to FIG. 1, the outer layer 302 may be a thin flexible layer, e.g., about 0.20 mm to about 0.30 mm (about 0.008 inch to about 0.012 inch, 8-12 mils), to allow for easier installation and replacement in small spaces. In other examples, such as discussed with respect to FIG. 2, the outer layer 302 may be thicker, e.g., about 3 to 10 mm, or higher, providing a rigid shell. Furthermore, the outer layer 302 may be a more complex structure, including layers that provide self-sealing capabilities, for example, for use in military applications.

The outer layer 302 can be formed from any number of elastomeric materials, including, for example, a nitrile, a polyurethane, a polychloroprene, a polyepichlorohydrin, ethylene propylene diene monomer (EPDM), or any combinations or layers thereof. In an embodiment, a nitrile rubber is used to form this layer.

A fabric layer 304 is provided to give the wall structure 300 greater strength. The fabric layer 304 can enable a fuel cell formed from the wall structure to better withstand stresses from the vibration, inertia, fluid loads, and structural loads to which the fuel cell is subjected. The fabric layer 304 can also enhance the resistance of the structure to punctures.

The fabric layer 304 can be formed from any number of fabrics, including, for example, woven fabrics, non-woven fabrics, knitted fabrics, or layered combinations thereof. Materials that can be used to form the fabrics can include polyaramides (Kevlar), polyesters, other polyamides, celluloses, polyacrylics, polyacrylates, and carbon fibers, among others. The choice of fabric may be determined by the application. In an aircraft fuel tank, the fabric may be a woven mesh formed from nylon-6,6, while a military aircraft, such as a helicopter, may use a stronger fabric, such as Kevlar. The fabric can be treated with a rubberizing material to promote flexibility, an adhesion promoter (such as resorcinol formaldehyde latex) to promote adhesion, or both.

A barrier layer 306 is provided to decrease the amount of hydrocarbons that can diffuse out of the fuel cell and the amount of oxygen that can diffuse into the fuel cell. In some embodiments, the barrier layer 306 can be a polymer that is dissolved in a solvent and applied to the other materials, such as the fabric, and then allowed to dry, for example, at a temperature of about 60° C. to 100° C., or at a temperature of about 80° C. In this embodiment, multiple coatings may be applied to decrease the permeability, where each layer is allowed to dry before the next layer is applied. Polymers that can be used include nylon 6, nylon-6,6, nylon 12, nylon multi-polymer blends, polyaramides (Kevlar, Nomex), and combinations thereof, among others.

In some embodiments, the barrier layer 306 can be a barrier film. For example, the barrier layer 306 could include polymer films made from polyethylene terephthalate (PET), metallized PET, polyamides (nylons), polyacrylates, polyacrylics, ethylene vinyl alcohol (EVOH), and the like. The films can be used as a single layer or as laminates with other films. For example, EVOH is often sandwiched between other film layers for commercial use.

An inner layer 308 is provided for direct contact with the hydrocarbon contents. The inner layer 308 can be a cross-linked polymer that is resistant to the hydrocarbon contents, such as the vulcanized nitrile rubber formed by the recipe of Table 2 in the examples, other types of vulcanized rubber, or other crosslinked polymers. Any number of other hydrocarbon resistant materials may be used as well. As for the outer layer 302, the inner layer 308 can be a thin flexible layer, e.g., about 0.125 mm to about 0.30 mm (about 5 to about 10 mils).

Figure 4:
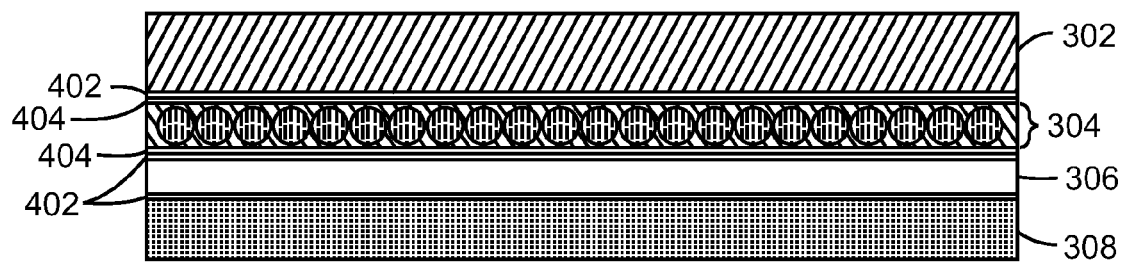
FIG. 4 is a schematic cross sectional view of the wall structure of FIG. 3 showing additional layers that may be used.

The wall structure 300 is not limited to the layers shown in FIG. 3, but may include additional layers, such as adhesives, rubberizing materials, and the like, as described with respect to FIG. 4. Further, not all layers have to be present in all embodiments, as described further with respect to FIGS. 5 and 6.

FIG. 4 is a schematic cross sectional view of the wall structure 400 of FIG. 3 showing additional layers that may be used in the formation of the wall structure. Like numbered items are as discussed with respect to FIG. 3. To obtain the desired structural characteristics a complex process is followed to assemble the fabric, as detailed in Table 1. For this structure, 17 steps are used to apply all of the materials. Some of the materials are applied as multiple layers of a solution, wherein each layer is allowed to dry before the application of the next layer. The sequential addition lowers the probability that a defect in a single layer will compromise the integrity of the wall structure. In the final steps, the outer layer 302 and the inner layer 308 are calendared to the sheet to form the final wall structure 400.

While the wall structure 400 shown in FIG. 4 provides a strong and relatively impermeable wall, the complexity of the formation process increases costs and can make the structure more vulnerable to faults that can lead to failures. Accordingly, new structures were developed to lower the complexity of the process while maintaining properties that were substantially the same, or better, than the wall structure shown in FIG. 4.

TABLE 1

Wall structure

| Step | Material | Reference No. |
|---|---|---|
| 17 | Rubber sheet | 302 |
| 5 | Adhesive* | 402 |

TABLE 1-continued

Wall structure

| Step | Material | Reference No. |
|---|---|---|
| 4 | Adhesion promoter* | 404 |
| 3 | Adhesion promoter* | 404 |
| 2 | Rubberizing* | 304 |
| 1 | Rubberizing* | 304 |
|   | Fabric | 304 |
| 1 | Rubberizing* | 304 |
| 2 | Rubberizing* | 304 |
| 3 | Adhesion promoter | 404 |
| 4 | Adhesion promoter | 404 |
| 6 | Adhesive* | 402 |
| 7 | Adhesive* | 402 |
| 8 | Adhesive* | 402 |
| 9 | Adhesive* | 402 |
| 10 | Vapor barrier* | 306 |
| 11 | Vapor barrier* | 306 |
| 12 | Vapor barrier* | 306 |
| 13 | Adhesive* | 402 |
| 14 | Adhesive* | 402 |
| 15 | Adhesive* | 402 |
| 16 | Rubber sheet | 308 |

*Applied as a material dissolved in a solvent and allowed to dry before proceeding. Note that some layers, such as the fabric and rubberizing material are shown as a single layer.

Figure 5:
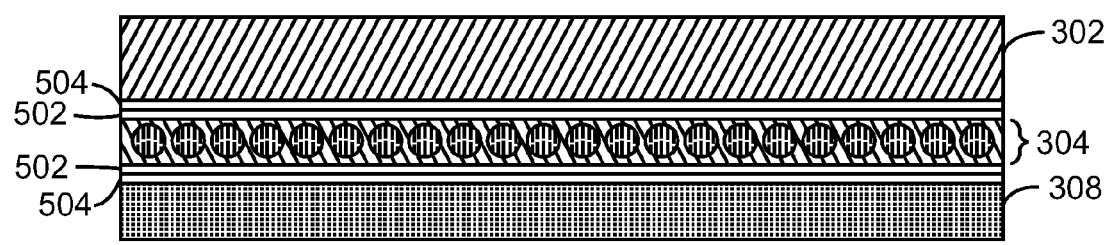
FIG. 5 is a schematic cross sectional view of another wall structure that can be used in a fuel cell wall.

FIG. 5 is a schematic cross sectional view of another wall structure 500 that can be used in a fuel cell wall. Like numbered items are as discussed with respect to FIGS. 3 and 4. In this embodiment, the fabric 304 is rubberized, as described herein, and vapor barrier layers 502 are applied directly to the each side of the rubberized fabric 304. Adhesive layers 504 are formed on each side of the vapor barrier 502. Adhesives that can be used herein can include any numbers of materials, such as isocyanates and polyisocyanates. In some examples, another layer of adhesion promoter may be applied between the vapor barrier 502 and the rubberized fabric 304 to further improve the adhesion performance. An outer layer 302 of rubber can be calendared to one side of the wall structure 500, while an inner layer 308 of rubber can be calendered to the opposing side.

Each of the vapor barrier layers 502 and the adhesive layers 504 may have multiple layers. For example, these layers 502 and 504 can be formed by the application of solutions, where each application of a solution is allowed to dry before the application of another layer.

The application of the vapor barrier 502 directly to the fabric decreases the number of steps needed to form the wall structure 500, for example, in comparison to the wall structure 400 described with respect to FIG. 4. Further, a vapor barrier 502 is formed on each side of the fabric 304, potentially providing a more reliable wall structure 500.

Figure 6:
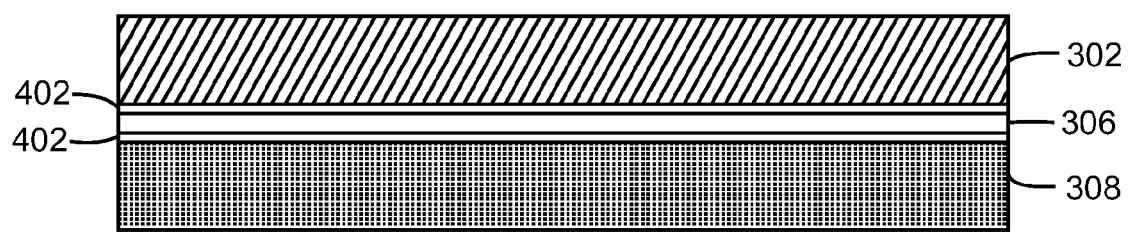
FIG. 6 is a schematic cross sectional view of another wall structure that can be used in a fuel cell wall.

FIG. 6 is a schematic cross sectional view of another wall structure 600 that can be used in a fuel cell wall. Like numbered items are as discussed with respect to FIGS. 3 and 4. In the wall structure 600, the barrier layer 306 is a film that also provides physical strength to the wall structure 600. As noted with respect to FIG. 3, the barrier layer 306 may be a polyethylene terephthalate (PET) film, a metallized PET film, or a film made from any number of other polymers, including multilayer composites.

An adhesive layer 402 is disposed on each side of the barrier layer 306. An outer layer 302 is disposed on one side of the barrier layer 306 and an inner layer 308 is disposed on the opposite side of the vapor barrier.

Figure 7:
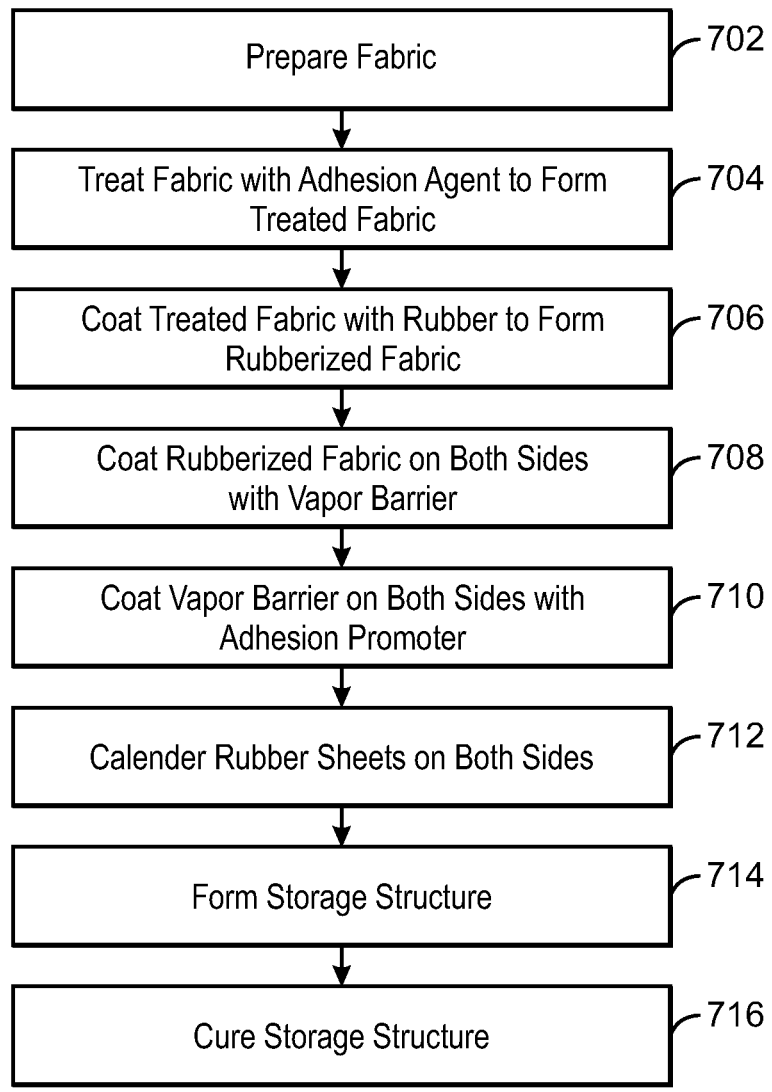
FIG. 7 is a method for forming a hydrocarbon storage container.

FIG. 7 is a method for forming a hydrocarbon storage container, for example, using the wall structure 500 described with respect to FIG. 5. This procedure, which may be termed a double barrier procedure, begins at block 702, with the preparation of the fabric. The preparation may include any number of techniques, such as scouring and heat setting a woven nylon fabric.

At block 704, the fabric may be treated with an adhesion improvement agent. For example, a nylon fabric can be treated with a Resorcinol-Formaldehyde Latex (RFL) solution to improve the adhesion of the fabric to a rubberizing solution.

At block 706, the fabric can be coated with a rubber solution to form a rubberized fabric. Any number of types of rubber can be used, including polyisoprene, polybutadiene, polynitrile, EPDM, and many other types of rubber. For example, an RFL coated nylon fabric can be treated with a rubber solution until saturated with the rubber. The rubber solution is then allowed to dry. The rubber coating assists in preventing wicking of liquids through the fabric and keeps the fabric flexible. After drying, the final coating thickness may be about 0.254 mm (about 1 mil) on each side.

At block 708, the rubberized fabric is coated on both sides with a vapor barrier solution and the solution is allowed to dry. Multiple coatings may be applied, with each coating dried before the application of the next coating. As an example, two coating applications may be used, resulting in a final thickness of about 0.51 mm (about two mils) on each side. The material used for the vapor barrier 306 may be as described with respect to FIG. 3.

At block 710, both sides of the material are coated with one or more layers of an adhesion promoter solution and the coating is allowed to dry between each application. After drying, the thickness of the adhesion promoter is about 0.018 mm (about 0.7 mils) on each side.

At block 712, rubber sheets are calendared to each side of the adhesion promoter-coated material. The rubber sheets can be about 0.254 mm (about 10 mils) in thickness on each side. For example, an outer layer 302 and an inner layer 308, as described with respect to FIG. 3, may be calendared to the adhesion promoter layers on each side of the material.

At block 714, a hydrocarbon storage structure is formed from the material. This is generally performed by laying the sheets over a mold in the desired shape of the final structure or fuel cell, and adhering, for example, gluing, the individual sides, and other parts, together. The adhering may be performed by applying a rubber solution that is cured during vulcanization.

At block 716, the structure is cured to cross-link the rubber materials used in the construction. The cross-linking may include vulcanization with sulfur compounds. Other types of crosslinking may be used in addition, or instead of vulcanization, for example, crosslinking double bonds in the rubber compound with a heat-activated free radical initiator, such as a peroxide compound. As described herein, the cross-linking may be performed by placing the structure in an autoclave under nitrogen, or other inert atmosphere, and heating the structure. For example, the curing may be conducted at around 75 C., 100 C., 150° C., or higher, for about 30 minutes (min.), 60 min., 120 min., 480 min., or longer.

Figure 8:
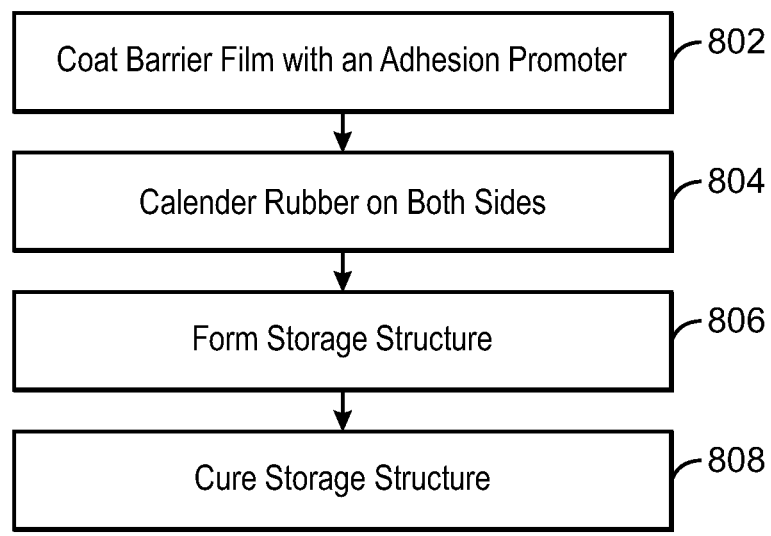
FIG. 8 is a method for forming a hydrocarbon storage container.

FIG. 8 is another method 800 for forming a hydrocarbon storage container. This method 800 can be used to form a wall structure 600 having a film as a barrier layer 306, such as described with respect to FIGS. 3 and 6. The method 800 begins at block 802, with the coating of the film with an adhesion promoter. The adhesion promoter can be applied in multiple layers, with each layer being allowed to dry before the application of the next layer. After all layers have dried, the thickness of the adhesion promoter will be about 0.018 mm (about 0.7 mils) on each side of the barrier layer 306.

At block 804, rubber sheets are calendered to each side of the adhesion promoter-coated material. The rubber sheets can be about 0.254 mm (about 10 mils) in thickness on each side. For example, an outer layer 302 and an inner layer 308, as described with respect to FIG. 3, may be calendered to the adhesion promoter layers on each side of the material.

At block 806, a hydrocarbon storage structure is formed from the material. This is generally performed by laying the sheets over a mold in the desired shape of the final structure or fuel cell, and adhering the individual sides, and other parts, together.

At block 808, the structure is cured to cross-link the rubber materials used in the construction. The cross-linking may include vulcanization with sulfur compounds. Other types of crosslinking may be used in addition, or instead of vulcanization, for example, crosslinking double bonds in the rubber compound with a heat-activated free radical initiator, such as a peroxide compound. As described herein, the cross-linking may be performed by placing the structure in an autoclave under nitrogen, or other inert atmosphere, and heating the structure. For example, the curing may be conducted at around 75° C., 100° C., 150° C., or higher, for about 30 minutes (min.), 60 min., 120 min., 480 min., or longer.

The methods described with respect to FIGS. 7 and 8 above may be used to form hydrocarbon storage structures for any number of applications. These structures may include, for example, fuel tanks for vehicles and temporary storage tanks for field applications, among others. Furthermore, the structures described herein are not limited to hydrocarbon storage. In some embodiments, the structures may be used for the storage of other liquids, such as potable or non-potable water. In the case of potable water, the materials for the inner layers, e.g., from the vapor barrier inwards to the contents, may be selected to allow contact with the water without leaching plasticizers, or other materials, that could affect the potability. Examples of various applications are described further with respect to FIGS. 9-12.

Figure 9:
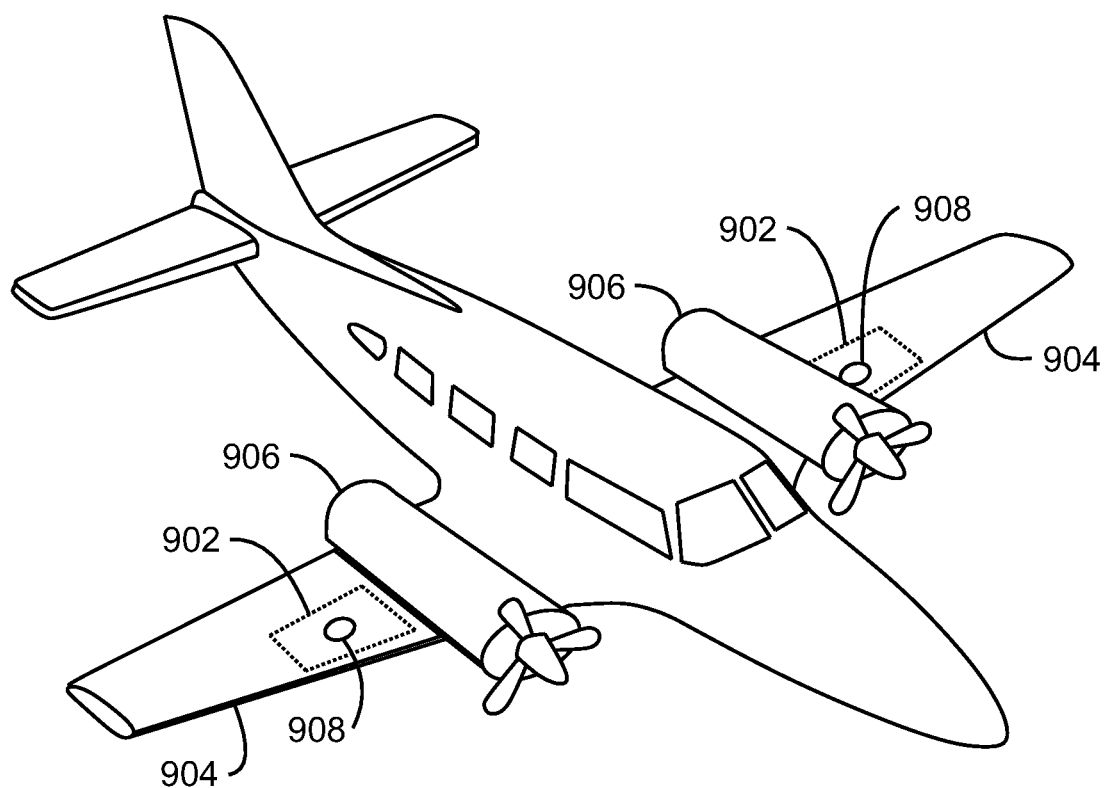
FIG. 9 is a drawing of an aircraft showing the use of a hydrocarbon storage container.

FIG. 9 is a drawing of an aircraft 900 showing the use of a hydrocarbon storage container as a fuel cell 902 in each wing 904. Although each fuel cell 902 is shown proximate to an engine 906, it can be understood that either fuel cell 902 can provide fuel to either engine 906, for example, by moving fuel between the fuel cells 902. Further, each fuel cell 902 may have a number of access ports built into the cell, including, for example, a refueling port generally located at the top of the fuel cell 902, and a drainage port (not shown), located at the bottom of a sump in the fuel cell 902.

Figure 10:
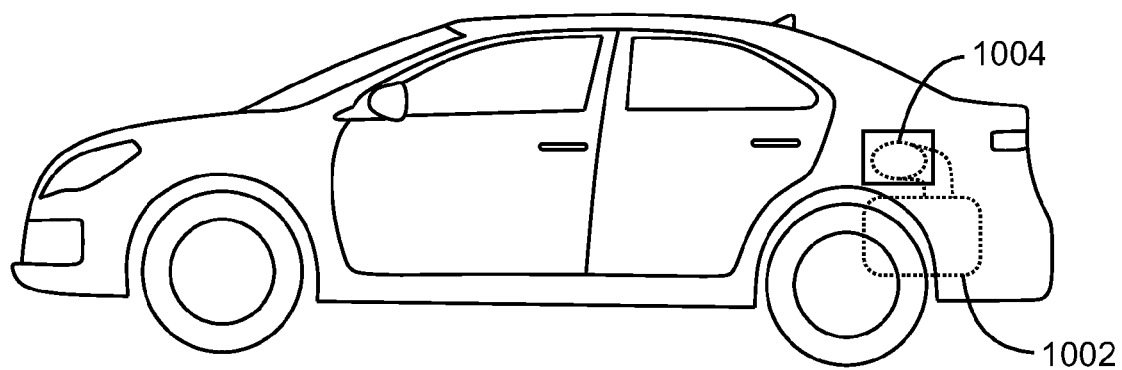
FIG. 10 is a drawing of a car showing the use of a hydrocarbon storage container.

FIG. 10 is a drawing of a car 1000 showing the use of a hydrocarbon storage container as a gas tank 1002. The gas tank 1002 can be refueled from a port 1004 that is generally accessed from the side of the car.

Figure 11:
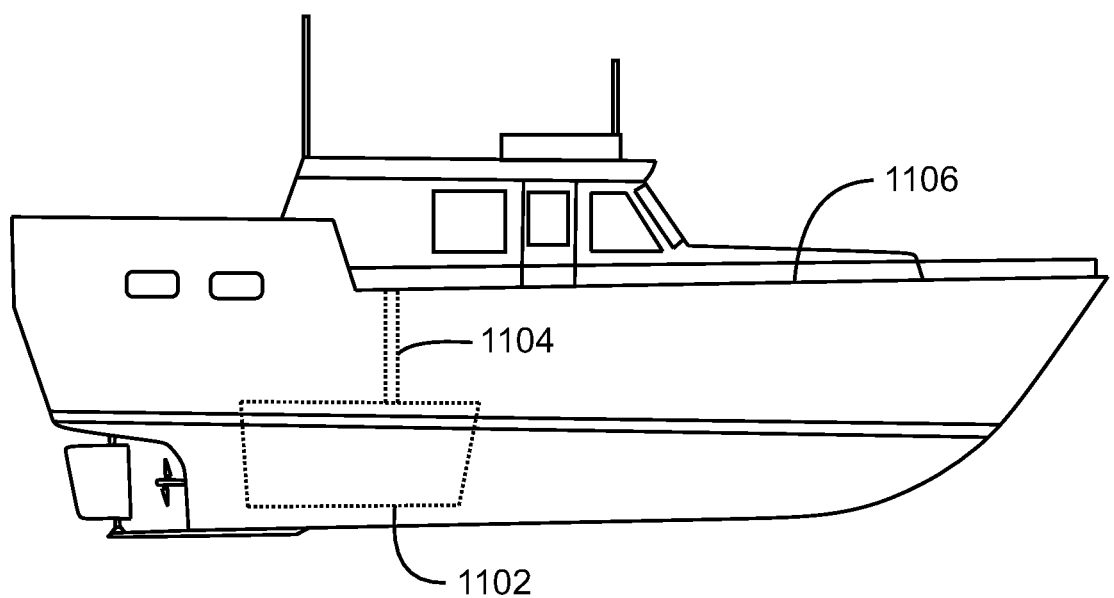
FIG. 11 is a drawing of a boat showing the use of a hydrocarbon storage container.

FIG. 11 is a drawing of a boat 1100 showing the use of a hydrocarbon storage container as a fuel tank 1102 or bunker. The fuel tank 1102 can be refilled from a port 1104 leading to the deck 1106 of the boat 1100. Other ports (not shown) can be used to provide ventilation to the tank, and fuel to the engine or generators.

Figure 12:
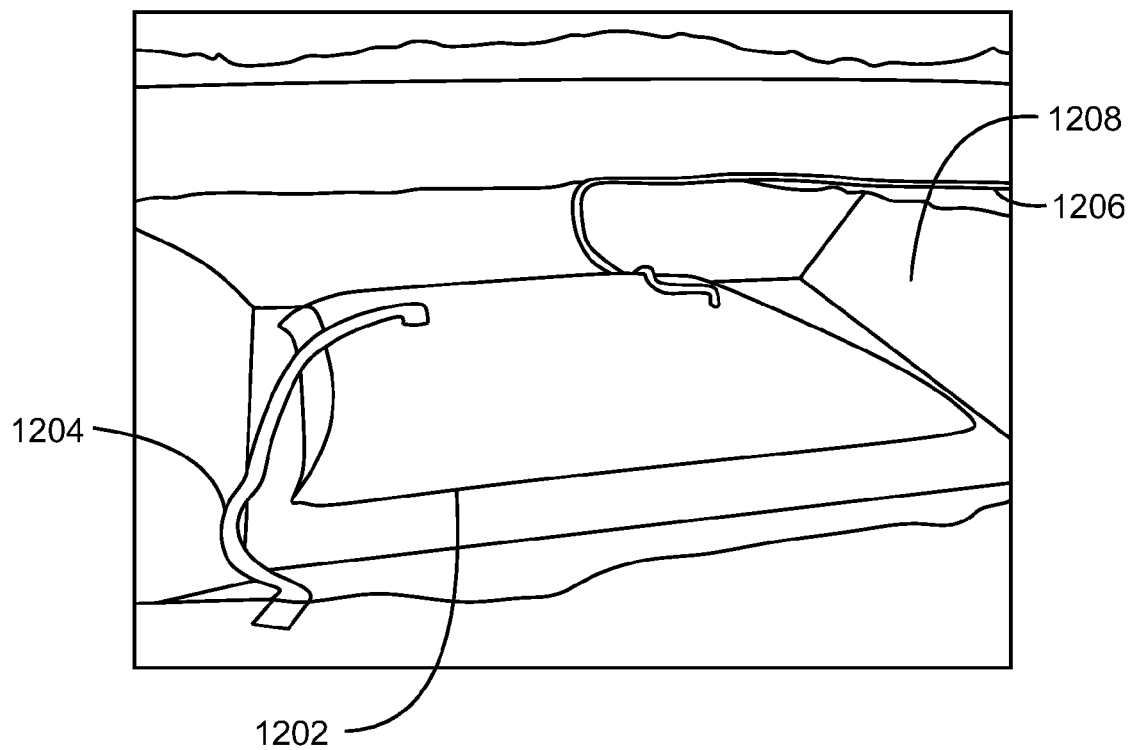
FIG. 12 is a drawing of a hydrocarbon storage container being used as a portable storage tank.

FIG. 12 is a drawing of a hydrocarbon storage container being used as a portable storage tank 1202. The portable storage tank 1202 can have lines 1204 and 1206 for refilling and use. A containment wall 1208, for example, lined with a plastic film, may be formed around the portable storage tank 1202 to hold spills. In embodiments in which the storage tank is designed to hold water, the containment wall 1208 may be omitted.

EXAMPLES

Screening of Rubber Compounds

An initial study, using a linear designed experiment, was conducted to identify a rubber formulation that may be used for the outer layers 302, inner layers 308, or both, as described herein. The study evaluated three types of rubber and three types of carbon black. Other formulation variables were held constant and were based on formulations used for fuel resistant applications provided by product suppliers.

The standard formulation, from which variations were tested, is shown in Table 2. The rubbers tested were all acquired from Zeon Chemicals of Pasadena, Tex. The specific grades tested included Nipol DN4555 (including 45% acrylonitrile monomer or 45 ACN), Nipol N32 (33 ACN), and Sivic Z740 (33 ACN with 30% polyvinyl chloride or 30 PVC). The carbon blacks tested were all obtained from Cabot Corporation of Boston, Mass. Various particle sizes and reinforcing levels were tested, including Sterling SO (N550), Sterling NS (N770), and Sterling 1120 (N990).

TABLE 2

Standard rubber formulation used for testing.

| Standard Formulation | Parts-per-hundred of monomer (phr) |
|---|---|
| Nitrile Elastomer | 100 |
| N550 Carbon Black | 50 |
| Zinc Oxide | 5 |
| Plasthall 7050 (plasticizer) | 20 |
| Antioxidant DQ | 2 |
| TETD Accelerator | 1 |
| TMTD Accelerator | 1 |
| Stearic Acid | 1 |
| OBTS Accelerator | 1 |
| Spider Sulfur | 0.5 |
| Antiozonant PD-2 | 3 |
| Antiozonant Nibud PM70 | 3 |
| Total Material | 187.5 |

Table 3 shows the tensile and elongation properties of the test samples in comparison to the control rubber. Formula number 1 in Table 3, made using 45 ACN rubber with N550 carbon black, most closely matched the tensile properties of the control rubber. Further, the 45% level of ACN in the rubber can improve fuel resistance over rubber compounds with lower amounts of ACN. Accordingly, this material was chosen for future studies.

TABLE 3

Tensile studies for nitrile rubber and carbon black type.
Properties are for rubber only.

| Formulation | 1 | 2 | 3 | 4 | 5 | 6 | 7 | 8 | 9 | Control |
|---|---|---|---|---|---|---|---|---|---|---|
| Rubber | 45 ACN | 33 ACN | PVC 45 | ACN 33 | ACN PVC | 45 CAN | 33 ACN | PVC | Control | |
| Carbon black | N550 | N550 | N550 | N774 | N774 | N774 | N990 | N990 | N990 | Control |
| Tensile Strength, Avg psi | 1973 | 1839 | 2373 | 1576 | 1355 | 2166 | 1108 | 612 | 1645 | 2309 |
| Tensile Strength, SD | 336 | 228 | 435 | 481 | 711 | 330 | 76 | 102 | 183 | 343 |
| % Elongation Avg | 855 | 579 | 367 | 769 | 570 | 488 | 817 | 297 | 527 | 950 |
| % Elongation, SD | 58 | 145 | 43 | 218 | 213 | 47 | 125 | 33 | 143 | 102 |

Plasticizer and Accelerator

Another designed experiment was completed to evaluate the accelerator package and the plasticizer level for the base formulation from the previous study. The variables selected for this experiment were the plasticizer level (6, 9 phr of Plasthall 7050), the accelerator type (tetraethyl thiuram disulfide (TETD), tetramethyl thiuram disulfide (TMTD), and N-oxydiethylene benzothiazole sulfenamide (OBTS)), and the accelerator level (0, 3 phr). The results indicated that three parts-per-hundred of monomer (phr) of accelerator provided the highest tensile strength and maximum elongation for each of the accelerators studied. Further, there was not a significant difference in tensile properties between six and nine phr plasticizer. However, elongation properties were greater at the six phr plasticizer level.

Two rubber compounds were synthesized from the points selected using the experiment and examined for their tensile properties. Both of the rubbers had a good balance of properties, but neither provided significant improvements over the base formulation, perhaps due to curing time.

Slower Cure Rubber

Based on concerns regarding rapid cure time of the Base rubber formulation, the material was reformulated to achieve a slower cure sample by increasing the ratio of sulfur to accelerators. The material showed excellent properties, as listed in Table 4 at longer melt press times. In this test, a melt press was used to simulate curing in an autoclave. However, melt press cure times may not directly correlate to autoclave times.

The plasticizer chosen was Paraplex A-8200, a medium molecular weight polyester adipate available from Hallstar. The Plasthall 7050 used in the test formulations described herein is a monomeric dialkylether glutarate, which leaches into the fuel during fuel soak and permeation tests. The control rubber also leaches some plasticizer as revealed by FTIR of the fuel soak and perm cup test fluid after testing. The higher molecular weight plasticizer was selected to reduce leaching of the plasticizer once exposed to fuel.

FAA: TSO-C80 Testing

The structures used for fuel cells in aircraft are subject to aviation requirements and certifications. One such test protocol is the Federal Aviation Administration (FAA) standard: TSO-C80, which includes various test standards, such as gum inner liner strength, permeability, seam adhesion, and puncture resistance, among others. Fuel cell structures meeting these requirements will likely be sufficient for any number of other applications, including cars, trucks, boats, helicopters, and other vehicles.

Gum Inner Liner Strength

The gum inner liner strength was measured according to the TSO-C80 by soaking 10 tensile specimens of each rubber sample (cured rubber alone) in both test fuel and water for about 72 hours at about 57.2+/−0.56° C. (about 135+/−3° F.). Both the soaked and unmodified, cured rubber samples were tested for tensile properties. The soaked materials were tested within four hours of removal from the soak. Tensile strength and elongation were tested in accordance with ASTM D412. Samples were prepared by using a

TABLE 4

Tensile properties for slower cure rubber.

| 45 Min. | Width (mm/in) | Thickness (mm/in) | Load at Break (N/lbf) | Extension at Break (in) | Tensile Stress at Break (MPa/psi) | Tensile Strain at Break (%) |
|---|---|---|---|---|---|---|
| 1 | 12.7/0.5 | 0.41/0.016 | 106/23.8 | 505/19.9 | 20.30/2943.6 | 994.6 |
| 2 | 12.7/0.5 | 0.43/0.017 | 102/23.0 | 483/19.0 | 18.86/2735.4 | 948.6 |
| 3 | 12.7/0.5 | 0.43/0.017 | 106/23.9 | 503/19.8 | 19.79/2870.2 | 989.3 |
| 4 | 12.4/0.49 | 038/0.015 | 103/23.1 | 549/21.6 | 21.69/3145.2 | 1079.9 |
| Mean | 12.7/0.5 | 0.41/0.016 | 105/23.5 | 511/20.1 | 20.16/2923.6 | 1003.1 |
| Standard Deviation | 0 | 0.0254/0.001 | 2/0.46 | 27.9/1.1 | 1.18/171.0 | 55.2 |

Higher Molecular Weight Plasticizer

Another modified rubber formulation was made and tested as described below for the TSO-C80 gum inner liner strength test. The Base rubber formulation was modified with a higher molecular weight (HMW) plasticizer at 10 phr.

clicker press to stamp out samples from the cured rubbers into ASTM D412 Type A dogbone geometry. The extension rate for the test was 2 inches per minute. An Instron 5582 equipped with a 5 kN (1,124 lbf) load cell was used for the test procedure. The requirements for the TSO-C80 test are <50% decrease in tensile strength for fuel soak and <20% decrease in tensile strength for water soak.

Under the test conditions, a control rubber failed the fuel soak requirement with a 54.4% change in tensile for fuel soak, and passed the water soak test with a 9.6% change in tensile. All of the test rubbers exceeded the requirements. The base rubber formulation showed 40.7% decrease after fuel soak and a marginal increase (1.5%) in tensile properties after water soak. The formulation created to have a longer cure time (increased sulfur-based cure) also passed both requirements with 34.4% decrease in fuel and 3.8% increase in water. Both rubber formulations from the plasticizer and accelerant studies, discussed above, were also tested, and passed the fuel and water soak as shown below in Table 5. The final rubber tested was a sample that was reformulated with a high molecular weight plasticizer that may resist fuel leaching more effectively than lower molecular weight plasticizers. This rubber formulation also easily passed the TSO-C80 requirement for fuel soak, as shown in Table 5, although water soak was not tested for this sample.

TABLE 5

Comparison of all samples in fuel and water soak tests.

| Rubber Formulation | % change in Fuel Soak | % change in Water Soak |
|---|---|---|
| Control | −54.4 | −9.6 |
| Base | −40.7 | +1.5 |
| Slower Cure | −34.4 | +3.8 |
| Plasticizer Study | −23.7 | −6.5 |
| Accelerant Study | −41.5 | +11.1 |
| HMW Plasticizer | −23.2 | n/t |

Permeability

Initial permeability testing was completed according to the ASTM D814 method. The ASTM D814 method indicated that 200 mL of test fluid should be used for permeability testing. The test fluid was mixed to match the Hydrocarbon Fluid Type III, required by the TSO-C80 specification, using HPLC grades of toluene and isooctane at a 30/70 volume/volume ratio. The ASTM D814 method requires the use of glass jars with precision ground, flattened edges, and metal rings cut to fit inside the original glass jar screw cap. The fabric samples are cut with a punch to ensure clean edges on the sample. The fabric samples are then secured to the jar lid using the metal ring and screw-on cap. The permeability testing method was modified by adding only 100 mL of test fluid in order to more closely mimic the TSO-C80 testing methods.

Results for the testing done using lab scale fabrics under the initial testing conditions are shown in Table 6 below. All of the test fabrics performed better than the control fabric, with only two of the 20 total fabrics showing failure, as indicated by bold print in the table. The failure level of the two fabrics was substantially higher than the acceptable permeation rate and suggests a defect in the fabric or in the set up for that fabric sample.

TABLE 6

Comparison of MPI fabrics to Control fabric (FFC) using old perm cup method (200 mL test fluid, barrier away from fuel, ±0.01 g balance).

| | Days 3 to 6 g/m²/24 hr | Days 6 to 11 g/m²/24 hr |
|---|---|---|
| Al Mylar (FIG. 6, metallized films) | | |
| 1 | −2.39 | −2.39 |
| 2 | 0.00 | 0.00 |
| 3 | −7.16 | 0.00 |
| 4 | 0.00 | 0.00 |
| 5 | 0.00 | 2.39 |
| Plain Mylar (FIG. 6, plain film) | | |
| 1 | 78.79 | 33.42 |
| 2 | −7.16 | 0.00 |
| 3 | 0.00 | 2.39 |
| 4 | 0.00 | 0.00 |
| 5 | 0.00 | 0.00 |
| Control structure, new rubber (FIG. 4) | | |
| 1 | −2.39 | 2.39 |
| 2 | −2.39 | 2.39 |
| 3 | 0.00 | 2.39 |
| 4 | −2.39 | 2.39 |
| 5 | −7.16 | 2.39 |
| Double Barrier (FIG. 5) | | |
| 1 | −7.16 | 2.39 |
| 2 | −4.77 | 2.39 |
| 3 | −2.39 | 0.00 |
| 4 | 193.38 | 66.85 |
| 5 | −4.77 | 2.39 |
| Control (FIG. 4) | | |
| 1 | 2.39 | 4.77 |
| 2 | 4.77 | 7.16 |
| 3 | 2.39 | 9.55 |
| 4 | 2.39 | 7.16 |
| 5 | 2.39 | 9.55 |

Seam Adhesion

Seam adhesion testing on the fabrics was performed using a dry seam adhesion method. The fabrics were joined using a glue mixture of rubber pellets with methyl ethyl ketone (MEK). After curing, the doubled fabrics were tested for seam adhesion using an Instron 5582 test frame with a pull rate of 2 inches per minute. The test fabrics performed comparably to the control fabric. The aluminized Mylar (PET) sample had very high seam adhesion results and these will also need to be confirmed by testing pilot scale material.

Puncture Resistance.

Samples were fabricated and sent in triplicate for puncture testing using a puncture device consistent with the TSO-C80 requirements. One of the double barrier fabrics (of the type shown in FIG. 4, above) was too small to fit in the fixture, therefore only 2 samples were tested for that fabric. The results are reported in Table 7 below and show that all of the fabrics well exceeded the 15 lb. (67 N) requirement from the TSO-C80.

TABLE 7

Puncture testing results for test fabrics.

| Fabric Type | Max Puncture force, (N/lbs.) |
|---|---|
| Control | 258/58.1 |
| | 252/56.7 |
| | 230/51.6 |
| Double Barrier | 249/55.9 |

TABLE 7-continued

Puncture testing results for test fabrics.

| Fabric Type | Max Puncture force, (N/lbs.) |
|---|---|
| (FIG. 5) | 269/60.5 |
|  | not tested |
| Plain Mylar | 148/33.0 |
| (FIG. 6, plain film) | 125/28.2 |
|  | 133/29.8 |
| Aluminized Mylar | 135/30.4 |
| (FIG. 6) | 138/31.2 |
| (metallized films) | 139/31.2 |

While the present techniques may be susceptible to various modifications and alternative forms, the exemplary embodiments discussed above have been shown only by way of example. However, it should again be understood that the present techniques are not intended to be limited to the particular embodiments disclosed herein. Indeed, the present techniques include all alternatives, modifications, and equivalents falling within the true spirit and scope of the appended claims.

What is claimed is:

1. A wall structure for a hydrocarbon storage vessel, comprising:
    an inner layer comprising a first rubber compound;
    a barrier layer comprising a polymer;
    a fabric layer; and
    an outer layer comprising a second rubber compound.

2. The wall structure of claim 1, wherein the first rubber compound, the second rubber compound, or both, comprises a nitrile rubber or a urethane rubber, wherein the fabric layer increases strength of the wall structure, and the barrier layer to decrease diffusion of hydrocarbon and oxygen.

3. The wall structure of claim 1, wherein the first rubber compound, the second rubber compound, or both, is vulcanized, wherein the inner layer comprising the first rubber compound is a flexible layer having a thickness of less than about 0.010 inch, and wherein the outer layer comprising the second rubber compound is a flexible layer having a thickness of less than about 0.012 inch, or is a rigid layer having a thickness of at least about 0.12 inch.

4. The wall structure of claim 1, wherein the first rubber compound, the second rubber compound, or both, is cross-linked by a free radical initiator.

5. The wall structure of claim 1, comprising an adhesive layer on each side of the barrier layer, wherein the polymer comprises a polymer film, and wherein the polymer film comprises a polyethylene terphathlate (PET) polymer.

6. The wall structure of claim 1, wherein the polymer comprises a polymer film, and wherein the polymer film comprises an ethylene-vinyl alcohol (EvOH) polymer, a polyamide polymer, or a polyethylene copolymer.

7. The wall structure of claim 1, wherein the polymer comprises a polymer film, and wherein the polymer film is metallized on at least one side.

8. The wall structure of claim 1, wherein the polymer comprising the center barrier layer comprises two polymer films.

9. The wall structure of claim 1, wherein the barrier layer comprising the polymer coats the fabric layer, wherein the fabric layer comprises a rubberized fabric, and wherein the fabric layer is disposed between the barrier layer and the outer layer.

10. The wall structure of claim 1, wherein the fabric layer comprises a woven fabric, non-woven fabric, knitted fabric, or layered combinations thereof, and wherein the fabric layer is treated with a rubberizing material and an adhesion promoter.

11. The hydrocarbon storage vessel of claim 1, wherein the fabric layer comprises a rubberized fabric, and wherein the polymer comprises nylon or a polyaramide that coats the fabric layer.

12. The wall structure of claim 1, wherein the outer layer is calendared to one side of the wall structure and the inner layer is calenderer to other side of the wall structure.

13. The hydrocarbon storage vessel of claim 1, wherein the barrier layer is a vapor barrier layer and comprises a polyethylene terephthalate (PET) film or a metallized PET film.

14. The wall structure of claim 1, wherein the barrier layer comprises two vapor barrier layers comprising a first vapor barrier layer applied to one side of the fabric layer and a second vapor barrier layer applied to other side of the fabric layer.

15. The wall structure of claim 14, comprising a first adhesive layer that improves adhesion performance of the first vapor barrier layer to the one side of the fabric layer, and a second adhesive layer that improves adhesion performance of the second vapor barrier layer to the other side of the fabric layer.

16. The wall structure of claim 14, comprising a first adhesive layer on the first vapor barrier and a second adhesive layer on the second vapor barrier, the first and second adhesive layers comprising isocyanates and polyisocyanates.

17. The wall structure of claim 1, wherein the fabric layer comprises fabric coated with a third rubber compound to form a rubberized fabric, wherein the third rubber compound comprises polyisoprene, polybutadiene, polynitrile, or ethylene propylene diene monomer (EPDM) rubber, wherein the barrier layer comprises two vapor barrier layers comprising a first vapor barrier coated on one side of the fabric layer and a second vapor barrier coated on other side of the fabric layer.

18. The wall structure of claim 17, wherein a side of the first vapor barrier side opposite the fabric layer comprises adhesion promoter coating, and wherein a side of the second vapor barrier opposite the fabric layer comprises adhesion promoter coating.

19. The wall structure of claim 18, wherein the outer layer comprising the first rubber compound is calendared to the adhesion promoter-coated side of the first vapor barrier, and wherein the inner layer comprising the second rubber compound is calendared to the adhesion promoter-coated side of the second vapor barrier.

20. A hydrocarbon storage vessel comprising a wall structure comprising:
    an inner layer comprising a first rubber compound, the inner layer for contact with a hydrocarbon in the hydrocarbon storage vessel;
    a barrier layer comprising a polymer, the barrier layer to decrease diffusion of hydrocarbon and oxygen;
    a fabric layer that increases strength of the wall structure; and
    an outer layer comprising a second rubber compound, the outer layer for contact with an environment of the hydrocarbon storage vessel.

21. A hydrocarbon storage vessel comprising a wall structure comprising:
    an inner layer comprising a first rubber compound, the inner layer for contact with hydrocarbon in the hydrocarbon storage vessel;

a barrier layer comprising a polymer film that provides physical strength to the wall structure, the barrier layer to decrease diffusion of hydrocarbon and oxygen;
an adhesive layer disposed on each side of the barrier layer; and
an outer layer comprising a second rubber compound, the outer layer to provide resistance to an environment of the hydrocarbon storage vessel.

* * * * *